United States Patent
Tan et al.

(10) Patent No.: US 8,452,527 B2
(45) Date of Patent: May 28, 2013

(54) METHOD OF AUTOMATIC POSITIONING FOR LOADING AND UNLOADING OF CONTAINER SHIPS IN CONTAINER TERMINALS

(75) Inventors: Han-Shue Tan, Concord, CA (US); Jihua Huang, Richmond, CA (US); Fanping Bu, Foster City, CA (US); Hongjun Song, Lafayette, CA (US); Gregory Keith Warf, Fairfield, CA (US)

(73) Assignee: Containertrac, Inc., Richmond, CA (US)

( * ) Notice: Subject to any disclaimer, the term of this patent is extended or adjusted under 35 U.S.C. 154(b) by 333 days.

(21) Appl. No.: 12/902,023

(22) Filed: Oct. 11, 2010

(65) Prior Publication Data
US 2012/0089320 A1    Apr. 12, 2012

(51) Int. Cl.
*B65G 63/00*    (2006.01)
(52) U.S. Cl.
USPC ............................ 701/300; 701/50; 414/140.3
(58) Field of Classification Search
None
See application file for complete search history.

(56) References Cited

U.S. PATENT DOCUMENTS

| | | | |
|---|---|---|---|
| 4,973,219 A | 11/1990 | Brickner et al. | |
| 5,089,972 A * | 2/1992 | Nachman et al. | 700/218 |
| 2002/0024598 A1 | 2/2002 | Kunimitsu et al. | |
| 2004/0030478 A1* | 2/2004 | Holland et al. | 701/50 |
| 2008/0117040 A1 | 5/2008 | Peel et al. | |
| 2008/0281618 A1 | 11/2008 | Mermet et al. | |
| 2009/0177394 A1 | 7/2009 | Walz et al. | |
| 2010/0145501 A1* | 6/2010 | Guilbert et al. | 700/218 |

OTHER PUBLICATIONS

International Search Report and Written Opinion dated Feb. 28, 2012 for International Application No. PCT/US2011/054980.

* cited by examiner

*Primary Examiner* — Michael J Zanelli

(57) ABSTRACT

A method is provided for automatically locating a container in a stowage location of a container ship for loading and unloading of the container ship in container terminals. The method includes the following steps: obtaining the position information of the container ship from container ship positioning units, obtaining the position information of the container from container positioning units when the container is in its stowage location, and determining the stowage location of the container in the container ship by first computing a relative position of the container in the container ship based on both the position information of the container ship and the position information of the container and then correlating the relative position with a stowage plan of the container ship.

16 Claims, 6 Drawing Sheets

METHOD OF AUTOMATIC POSITIONING FOR LOADING AND UNLOADING OF CONTAINER SHIPS IN CONTAINER TERMINALS

BACKGROUND

1. Technical Field

The present invention relates to locating a container in a stowage location on a container ship during loading and unloading of the container ship in a container terminal to enable tracking containers when they are loaded or unloaded at the container terminal.

2. Related Art

Over the recent decade, the number of shipping containers handled in container terminals has increased dramatically, which demands the container terminal operators increase their container handling efficiency. In particular, the efficiency of loading and unloading container ships is of great interest due to its direct effects on the ship turnaround.

For loading and unloading container ships, container cranes (also known as container handling gantry cranes or ship-to-shore cranes) are typically used. During loading and unloading of container ships, the container crane operator must be informed about the containers to be loaded or unloaded. While the stowage plan of a container ship is transmitted electronically from the departure port to the destination port, the crane operator may receive work instructions electronically (e.g., on a display) during the operations or in paper form before commencing the loading or unloading operations. The work instructions specify the stowage location of containers to be loaded into or unloaded from the container ship. The crane operator sits at the head of the crane, moves the head to the specified stowage location, and picks up a container from or drops off a container to the specified stowage location.

Two major issues with the above typical practice greatly limit the efficiency of container handling efficiency. First, although ideally the crane operator should be able to move the crane head to the stowage location specified in the work instruction to pick up or drop off a container, the crane operator from time to time makes wrong judgments about where the crane head is relative to the container ship and conducts container operations at wrong stowage locations. Therefore, clerks are often assigned to each crane to (1) manually check the ID of the container unloaded from the ship to ensure its correctness and (2) verify the location of a container as it is loaded into the ship. Such practice not only requires more staffing at a container terminal but also increases the handling time for each container. Some container terminals install Optical Character Recognition (OCR) systems on cranes to help verify the ID of the containers being unloaded from the ship, thereby reducing the requirements on staffing; however, OCR systems sometimes have difficulty in recognizing container IDs especially when the IDs are obscured for various reasons. Moreover, OCR systems cannot verify whether a container is loaded to the intended stowage location during the loading of a container ship.

Second, to increase container handling efficiency, inventory tracking systems are commonly used in container terminals. However, such systems are limited to the automatic tracking of containers inside a container terminal; clerks still need to manually create an entry in the inventory tracking system for every container that has been unloaded from a container ship and manually remove an entry or mark the entry as departed once the corresponding container has been loaded into a container ship. The primary reason is that those inventory tracking systems typically employ real-time positioning technology (such as Global Positioning System (GPS) and Real-time Locating System (RTLS)) and wireless communications to track locations of containers by actively tracking the movement and locations of container handling equipment (CHEs) that pick up, move, and set down the containers. This alone is not adequate for tracking containers for loading and unloading container ships: even if a container's position is know (e.g., based on the position of the crane's load-carrying member or spreader for handling the container), its corresponding stowage location in a container ship is unknown because (1) the container ship's position (including the orientation of the ship) is unknown and (2) the container ship's position shifts dynamically due to various factors such as tide and loading conditions. For example, a container ship can go up and down 6 to 8 feet twice a day due to tide; a one-degree orientation shift can create a position shift over 5 meter (more than twice the width of a typical container) for a container ship with length of 300 meters.

SUMMARY

In accordance with the embodiments of the present invention, a method is provided for locating a container in a stowage location of a container ship in a container terminal. The method includes three steps. First, position information of the container ship is obtained; the position information includes at least one of the following: (1) the orientation of the container ship and the position of at least one pre-selected location in the container ship, and (2) positions of at least two pre-selected locations in the container ship. The orientation of the container ship can be provided by orientation measuring sensors, such as compasses, angular velocity sensors, and Inertial Measuring Units.

The positions of the pre-selected locations can be provided by positioning units that employ absolute positioning systems or relative positioning systems. Example of the absolute positioning systems include a Global Positioning System (GPS), a Differential GPS (DGPS), a DGPS integrated with motion sensors, a DGPS/INS integration system, and a Real Time Kinematic (RTK) DGPS. Positioning units that employ absolute positioning systems are installed at the pre-selected locations in the container ship. Examples of relative positioning systems include vision systems, radar sensors, laser sensors, and radio frequency triangulation positioning systems. The positioning units that employ relative positioning systems are typically installed on a crane for lifting and lowering the container or on a land fixture; components (such as reflectors and radio frequency transmitter or receivers) may also be installed at the pre-selected locations in the container ship. Additional sensors, such as compasses, orientation measuring sensors, encoders for measuring the movement of the container handling part (e.g., a main spreader for holding the container in transit) with respect to the crane (or the installation location of the positioning units) can also be incorporated.

Second, the position information of the container is obtained while the container is in the stowage location. The position information can be provided by a position unit that employs absolute positioning systems or relative positioning systems. To determine whether the container is in the stowage location or in transit, container operation indicators are employed. Such container operator indicators may be twistlock switches that signal the engagement of the twistlock for picking up a container from the stowage location or the disengagement of the twistlock for releasing the container to the stowage location in the container ship. The container operator indicators may also be a switch input that can be turned on and off by the crane operator to signal when the container is in the stowage location.

Third, the stowage location of the container ship is determined by first computing a relative position of the container in the container ship based on the position information of the container ship and the position information of the container and then correlating the relative position with a stowage plan of the container ship. The relative position of the container in the container ship is determined by the following three substeps. (1) The position of a ship-fixed coordinate system with respect to a reference coordinate system is determined based on the position information of the container ship. The ship-fixed coordinate system is fixed onto the ship; it moves as the ship shift its position and rotates as the ship changes its orientation. (2) Based on the position of the ship-fixed coordinate system, a transformation relationship between the reference coordinate system and the ship-fixed coordinate system is established. And (3) the relative position of the container in the container ship is then derived by converting the position information of the container to a position in the ship-fixed coordinate system based on the transformation relationship. Subsequently, the relative position of the container in the container ship is compared or correlated to the stowage plan of the container ship to determine its corresponding stowage location.

According to the method, a system is provided for automatically locating a container in a container ship for loading and unloading of the container ship in container terminals. The system includes container ship positioning units for providing position information of the container ship, container operation indicators for indicating when the container is in a stowage location of the container ship, container positioning units for providing positions of the container being handled by a container crane, an input device for providing a stowage plan of the container ship, and a container locating processing module for determining the container's stowage location in the container ship.

In one embodiment, the position information of the container ship include positions of at least two pre-selected locations in the container ship; in another embodiment, the position information of the container ship include orientations of the ship and positions of at least one pre-selected location in the container ship. Both the container ship positioning units and the container positioning units can employ either absolute positioning systems or relative positioning systems as described earlier. The container ship positioning units may also include orientation measuring sensors such as compasses, angular velocity sensors, and IMUs to provide the orientations of the ship.

The container operation indicators may be twistlock switches or switches for accepting the crane operator's inputs. The input device for providing the stowage plan could be a computer or process module that can transmit the stowage plan to the container locating processing module (though wired or wireless communication). Other types of the input device could be memory devices (such as a USB memory stick) that can be connected to the container locating processing module for downloading the stowage plan to the container locating processing module.

The container locating processing module determines the container's stowage location in the container ship by determining when the container is in the stowage location based on the container operation indicators, obtaining position information of the container from the container positioning units when the container is in the stowage location, computing a relative position of the container in the container ship based on the positioning information from the container ship positioning units and the position information of the container, and correlating the relative position with the stowage plan of the container ship.

The container locating processing module may further output the position of the stowage location in the container ship to a loading/unloading job management module. The loading/unloading job management module receives and stores job instructions provided by the input device and then compares the identified stowage location with the job instructions to verify the correctness of the container operation. An interface device may also be included to display to the crane operator information such as the identified stowage location, the job instructions, and verification results.

The container locating processing module may further report the identified stowage location to an inventory management/tracking system, and the inventory management automatically updates an inventory database to reflect the loading and unloading of the container for active tracking of the container in the container terminal.

Furthermore, using the above method and system in a reverse fashion, a method and system is provided for determine the position of a stowage location of a container ship with respect to a reference coordinate system for automatic loading and unloading of the container ship. Container ship positioning units are still used to provide the position information of the container ship in the reference coordinate system. The stowage location is provided by an input device such as a process module (such as a computer or a embedded processor), a memory stick, or a keyboard (which allows operator to input the stowage plan manually). A container position generating module then determines the position of the stowage location in the reference coordinate system by (1) computing a relative position of the stowage location in a ship-fixed coordinate system, (2) determining a position of the ship-fixed coordinate system with respect to the reference coordinate system based on the position information from the container ship positioning units as described earlier, (3) deriving a transformation relationship between the reference coordinate system and the ship-fixed coordinate system based on the position of the ship-fixed coordinate system, and (4) converting the relative position of the stowage location in the ship-fixed coordinate system to the position of the stowage location in the reference coordinate system based on the transformation relationship.

In further embodiments, the container position generating module further outputs the generated position of the stowage location to a crane automation system and the crane automation system then moves a container handling part of a crane to the position of the stowage location for loading and unloading. Such a crane automation system includes container positioning units for providing positions of the container handling part, a crane control module for determining control commands based on the position of the stowage location and the positions of the container handling part, and crane control mechanisms for receiving the control commands and moving the container handling part to the position of the stowage location.

BRIEF DESCRIPTION OF THE DRAWINGS

Further details of the present invention are explained with the help of the attached drawings in which.

DETAILED DESCRIPTION

Figure 1A:
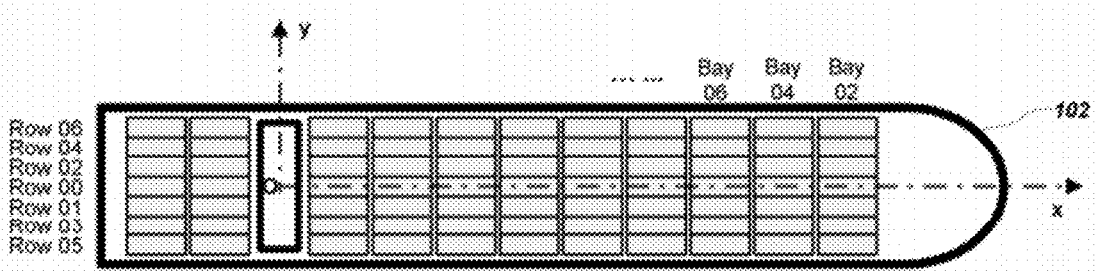
FIGS. 1A and 1B illustrate how a typical stowage plan specifies the stowage locations in a container ship.
Figure 1B:
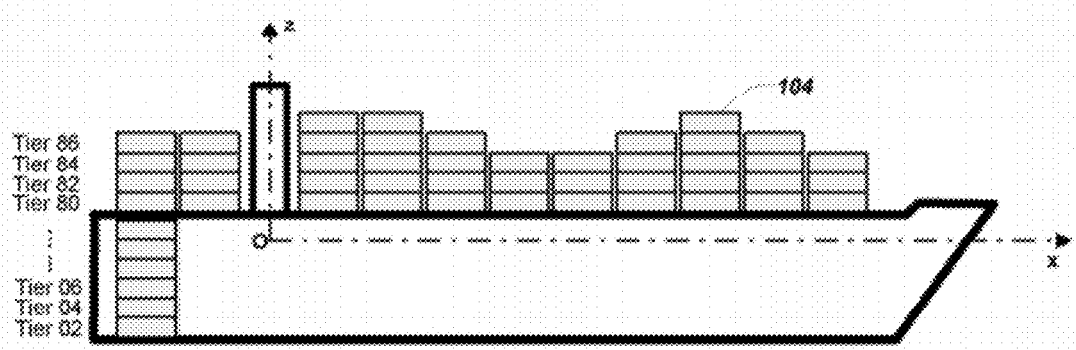

FIGS. 1A and 1B illustrate how a stowage plan specifies the stowage locations in a container ship. FIG. 1A shows the top view of a container ship 102 with containers 104 stacked on the deck; FIG. 1B shows the side view of the container ship 102 with a small part of cross-section view on the left to show containers stacked in the holds underneath the deck. The stowage locations are unambiguously stated in numbers using a bay-row-tier system. According to the bay-row-tier system, bays are the stowage locations in the transverse direction of the ship 102, rows are the lengthwise rows, and tiers are the vertical layers. The numbers shown in FIGS. 1A and 1B are a typical way of numbering the bay, row, and tier of the stowage locations. The stowage locations of containers are (almost always) recorded in the shipping document.

Figure 2:
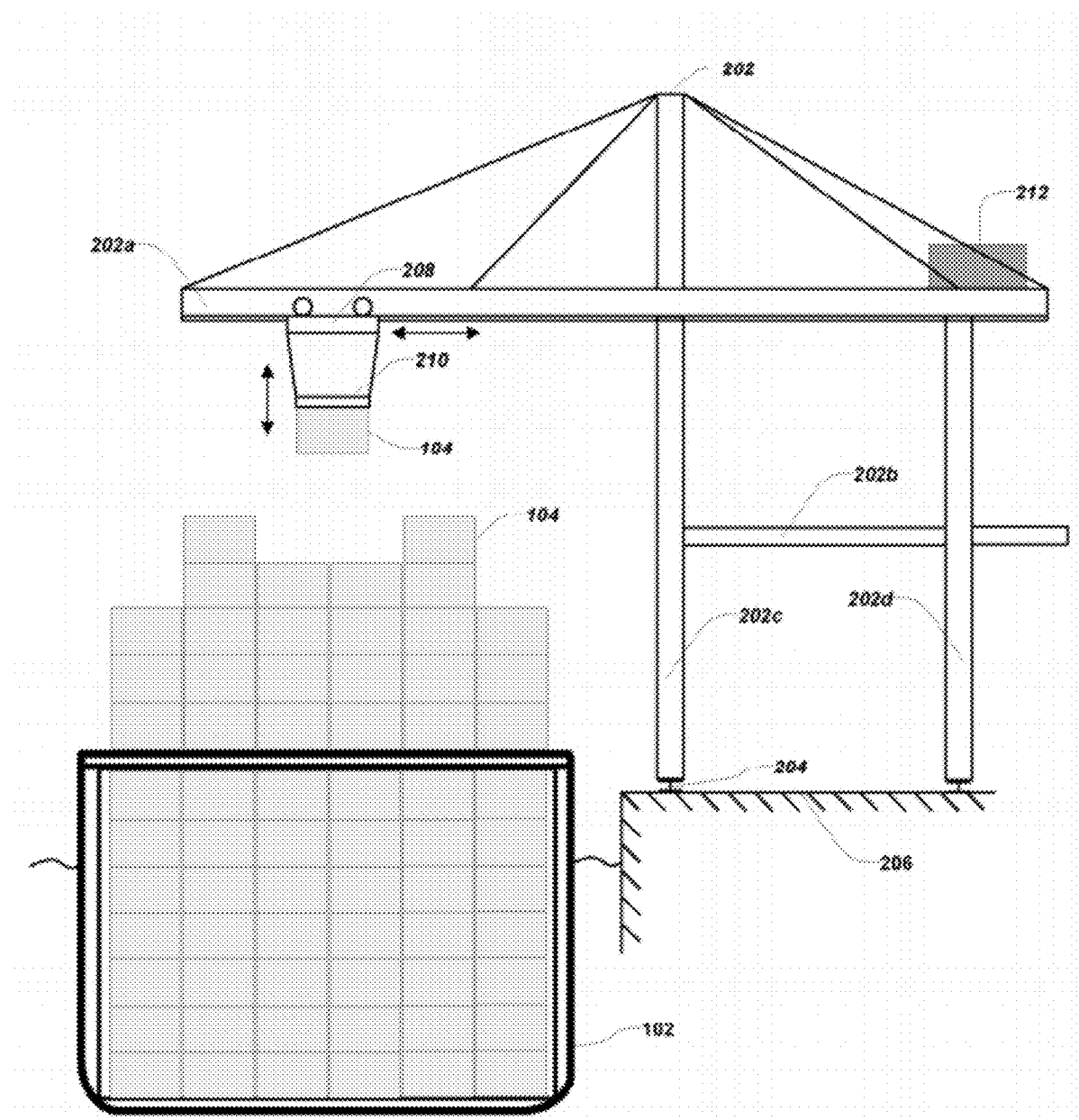
FIG. 2 shows a side view of the basic construction of a container crane for loading and unloading of container ships.

FIG. 2 shows a side view of the basic construction of a container crane 202 for loading and unloading of container ships. The basic configuration of the container crane 202 includes the main girder 202a, the auxiliary girder 202b, the ship-side leg 202c, and the land-side leg 202d. The container crane 202 is adapted to move along the rails 204 on the quay 206 for longitudinal movement along the ship. An end of the main girder 202a is extended to the sea and a main trolley 208 moves along the main girder 202a for lateral movement. A main spreader 210 for handling the container 104 is suspended from the main trolley 208 and can move up and down for vertical movement. The main trolley 208 and the main spreader 210 are driven by motors and drum mechanisms mounted in a machine room 212, and encoders (inside the machine room 212) are typically used to measure the lateral position of the main trolley 208 along the main girder 202a and the vertical position of the main spreader 210 from the main girder 202a.

FIGS. 3A, 3B, 4, and 5 show a method of locating a container in a stowage location of a container ship in a container terminal. The method includes the following steps: (1) obtaining the position information of the container ship; (2) obtaining the position information of the container when the container is in its stowage location; (3) determining the stowage location of the container in the container ship by first computing a relative position of the container in the container ship based on both the position information of the container ship and the position information of the container and then correlating the relative position with a stowage plan of the container ship.

Figure 3A:
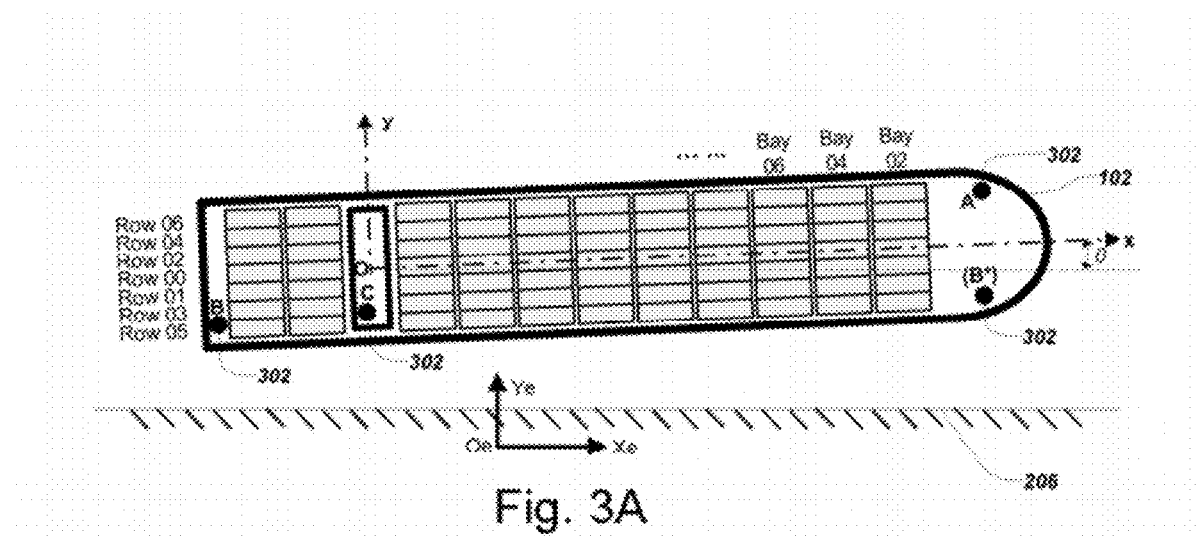
FIGS. 3A and 3B show an embodiment of the positioning units for providing the position information of the container ship, in which the positioning units employs absolute positioning systems and are installed at each of the pre-selected locations in the container ship.
Figure 3B:
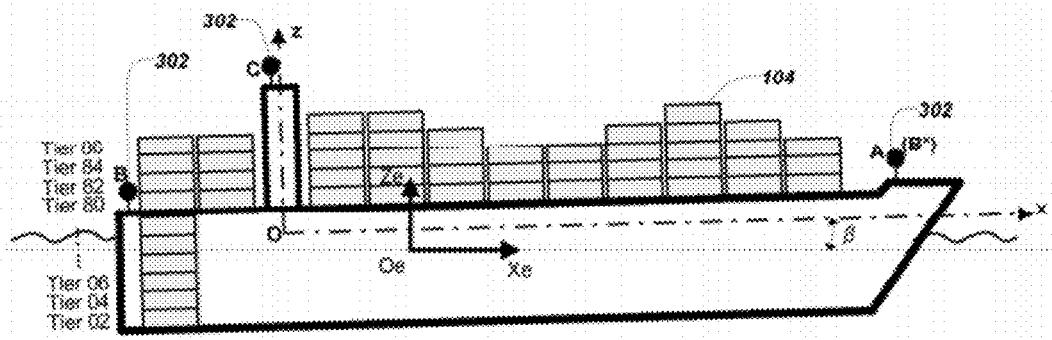

FIGS. 3A and 3B show an embodiment of the positioning units for providing the position information of the container ship. The position (including the orientation) of a container ship is required in order to locate a container in a stowage location of the container ship 102. In this method, positioning units are installed to obtain position information (including the orientation) of the container ship. In one embodiment, at least two locations, such as location A and location B, are pre-selected and the position information obtained include positions of each of these pre-selected locations. Alternatively, three locations, such as location A, B*, and C, could be selected. These locations are pre-selected to have a geometric relationship that facilitates the determination of the orientation of the container ship 102. For example, if two locations are selected, they are preferred to be at the diagonal end of the container ship (as illustrated by A and B); if three locations are selected, they are preferred to form an Isosceles triangle (as illustrated by A, B*, and C) that covers the span of the ship and facilitates the determination of the roll motion of the ship 102.

In another embodiment, the obtained position information of the container ship includes the position of at least one pre-selected location (such as location O in FIGS. 3A and 3B) and the orientation of the ship (such as the angles $\theta$, $\beta$, as well as an optional roll angle $\gamma$ (not shown)). In such an embodiment, the positioning unit includes orientation measuring sensors for providing orientation information of the ship; such orientation measuring sensors include compass, angular velocity sensors, and Inertial Measuring Unit (IMU), and they are typically installed in the ship.

The positioning units for providing positions of the pre-selected locations can be either absolute positioning systems or relative positioning systems. FIGS. 3A and 3B shows an embodiment in which absolute positioning systems are used and the positioning units 302 are installed at each of the pre-selected locations. Examples of the absolute position systems include Global Positioning System (GPS), a Differential GPS (DGPS), a DGPS integrated with motion sensors, a DGPS/INS integration system, and a Real Time Kinematic (RTK) DGPS. These absolute positioning systems are installed at the pre-selected locations, and directly provide the absolute positions of the pre-selected locations in the earth coordinate system.

Alternatively, relative positioning systems can be used as the positioning units to provide relative positions of each of the pre-selected locations in the container ship. The relative positioning systems can be vision systems, radar sensors/systems, laser sensors/systems, radio frequency triangulation positioning systems such as Radio Frequency Identification (RFID)-tag-based triangulation positioning systems, and so on. The relative position information of the pre-selected locations is obtained by processing images containing the pre-selected locations provided by a vision system, radar measurements of the pre-selected locations provided by a radar sensor, laser measures of the pre-selected locations provided by a laser sensor, or radio waves received by the radio frequency receivers in a radio frequency triangulation position system.

In embodiments where the positioning units employs relative positioning systems, the positioning units may be installed on the container crane (or a land fixture), or at the pre-selected locations in the container ship, or both. For example, if vision systems are used, the positioning unit (e.g., cameras) can be installed on the container crane (or a land fixture) to take images of the container ship and no component needs to be installed at the pre-selected locations. (Arguably, no specific locations need to be pre-selected when vision systems are used; for example, the ship's position can be identified by recognizing the profile of the ship from the images. On the other hand, it could also be argued that the ship profile includes a number of pre-selected locations at the edge of the ship.) Similarly, when radar or laser systems are used, the radar or laser sensors can be installed on the container crane (or a land fixture) and reflectors can (but not necessarily) be installed at the pre-selected locations to make them more visible in the radar or laser images. When radio frequency triangulation positioning systems are used, radio frequency transmitters (or receivers) are installed at the pre-selected locations in the container ship, and correspondingly, multiple radio frequency receivers (or transmitters) are installed on the crane (or a land fixture). The relative positions provided by such relative positioning systems are relative to a reference point, such as the known location where the camera, the radar or laser sensor, or the radio frequency receivers (or transmitters) are installed respectively.

With the (absolute or relative) position information of the pre-selected locations, the position of the container ship can be determined. As illustrated in FIGS. 3A and 3B, the positioning of the ship can be uniquely determined once a ship-fixed coordinate system (x-y-z with O as the origin) is determined. The ship-fixed coordinate system (x-y-z) is determined if the position of the origin O and the orientation of the x, y, z axis with respect to a reference coordinate system (such as Xe-Ye-Ze with Oe as the origin) are determined. The reference coordinate system can be an earth coordinate system that is fixed on the quay (i.e., the earth), which will not change. An earth coordinate system is preferred when the positioning units employs absolute positioning systems. In embodiments where the positioning units employ relative positioning systems, the reference coordinate system can be fixed on a known reference point on the container crane, e.g., the location of the camera, or the radar or laser sensor, or the radio frequency receivers (or transmitters); the reference coordinate system may move as the container crane moves.

The ship-fixed coordinate system x-y-z changes with respect to the reference coordinate system (e.g., Xe-Ye-Ze) due to factors such as tide and load conditions. That is, the position of O, (Oxe, Oye, Oze), changes and the orientation of the x axis and y axis changes, as shown by the angle $\theta$ and $\beta$. Hence, the ship's position can be uniquely determined if the position of the origin O and the angles $\theta$ and $\beta$ are known (assuming the roll motion of the container ship is negligible).

Since the pre-selected locations A and B are known, fixed location in the ship, their positions in the ship-fixed coordinate system, (Ax, Ay, Az) and (Bx, By, Bz), will not change. The positions of A and B, (Axe, Aye, Aze) and (Bxe, Bye, Bze) in the reference coordinate system, provided by the positioning units can be represented as:

$$\begin{bmatrix} Axe \\ Aye \\ Aze \end{bmatrix} = \begin{bmatrix} Oxe \\ Oye \\ Oze \end{bmatrix} + T \times \begin{bmatrix} Ax \\ Ay \\ Az \end{bmatrix} \text{ and } \begin{bmatrix} Bxe \\ Bye \\ Bze \end{bmatrix} = \begin{bmatrix} Oxe \\ Oye \\ Oze \end{bmatrix} + T \times \begin{bmatrix} Bx \\ By \\ Bz \end{bmatrix}$$

where T is the rotational transformation matrix between the two coordinate systems:

$$T = \begin{bmatrix} \cos\beta & 0 & -\sin\beta \\ 0 & 1 & 0 \\ \sin\beta & 0 & \cos\beta \end{bmatrix} \times \begin{bmatrix} \cos\theta & -\sin\theta & 0 \\ \sin\theta & \cos\theta & 0 \\ 0 & 0 & 1 \end{bmatrix}$$

Thus, the position of O (Oxe, Oye, Oze) and the angles $\theta$ and $\beta$ can be estimated based on the positions of A and B ((Axe, Aye, Aze) and (Bxe, Bye, Bze)) provided by the positioning units.

When three locations (such as A, B*, and C in FIG. 3A) are pre-selected, the assumption of negligible roll motion can be removed and positions of these three locations uniquely determines the ship-fixed coordinate system. The determination or computation of the ship-fixed coordinate system is also based on the rotational and translational transformation between the ship-fixed coordinate system and the reference coordinate system, with an additional rotational transformation added for the roll angle $\gamma$. The rotational transformation matrix T becomes $$T = \begin{bmatrix} 1 & 0 & 0 \\ 0 & \cos\gamma & -\sin\gamma \\ 0 & \sin\gamma & \cos\gamma \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} \cos\theta & -\sin\theta & 0 \\ \sin\theta & \cos\theta & 0 \\ 0 & 0 & 1 \end{bmatrix}.$$

In embodiments where the orientation of the ship (i.e., the angles $\theta$, $\beta$, as well as an optional roll angle $\gamma$) is directly obtained based on orientation measuring sensors such as compasses, angular velocity sensors, and IMU, the orientation of the ship-fixed coordinate system and the rotational transformation matrix T are readily available based on the sensor measurements. In such embodiments, the position of only one pre-selected location (such as O in FIGS. 3A and 3B) is needed to establish the position of the origin of the ship-fixed coordinate system.

The positions from the positioning units can be recorded in real-time for continuous determination and update of the container ship's position. Alternatively, since the container ship's position changes slowly, the position information can be recorded periodically, such as every half an hour or every one or two hours, and the container ship's position is determined and updated periodically. In some embodiments, the positions are recorded at specific times, for example, triggered by container operation indicators that indicate the specific time instance the crane drops off or picks up a container.

Additional sensors such as a level measuring sensor (e.g., laser or ultrasonic level measuring devices) can also be employed to enhance the positioning of the container ship. Moreover, most container ships are equipped with a GPS and this on-board GPS can be used as one positioning unit (e.g., the positioning unit 302 at location C as shown in FIGS. 3A and 3B).

Figure 4:
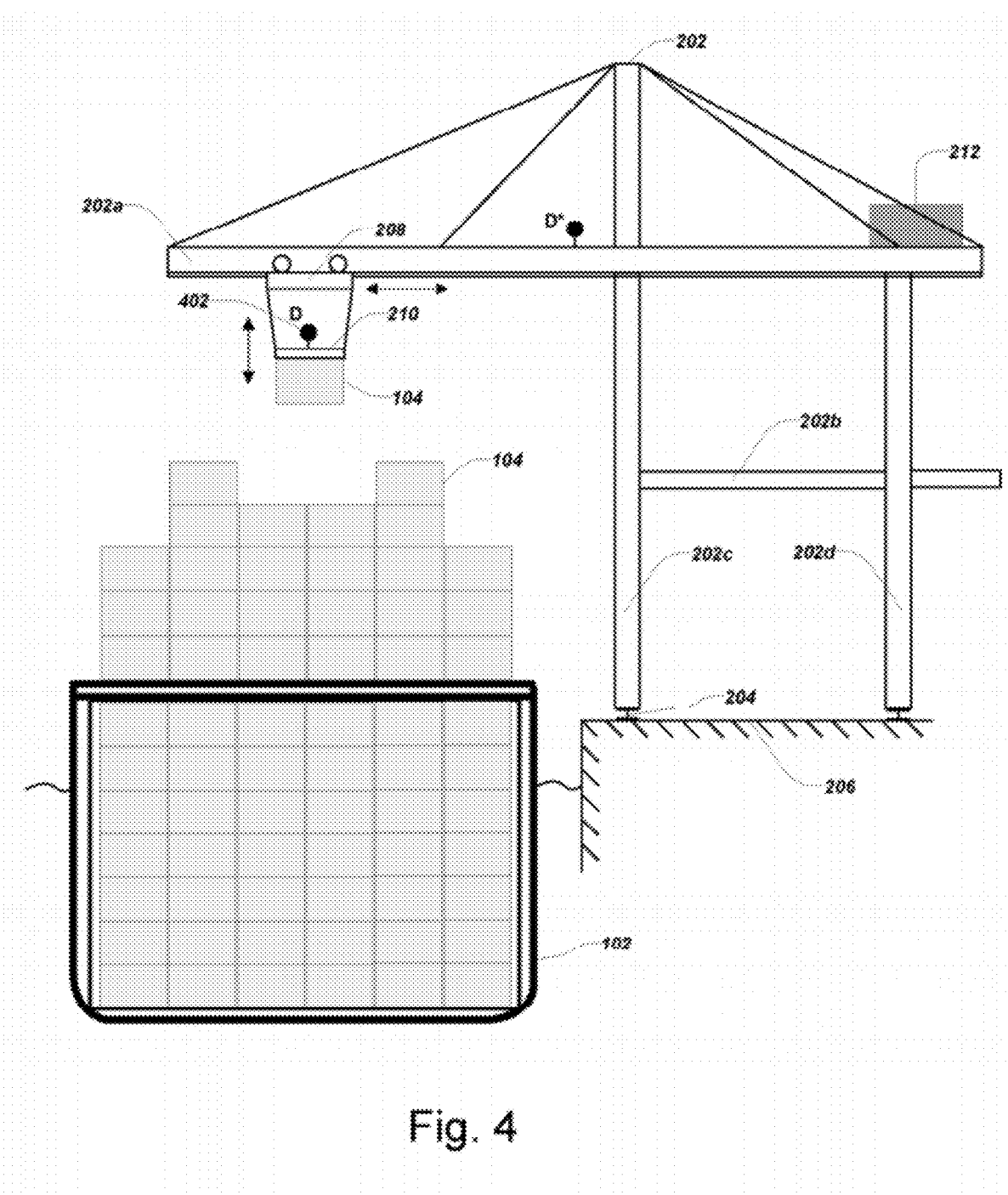
FIG. 4 shows an embodiment with a positioning unit for providing the position information of a container being handled by a container crane, in which absolute positioning systems are used.

FIG. 4 shows an embodiment with a positioning unit 402 for providing the position information of a container being handled by a container crane, in which absolute positioning systems are used. In one embodiment, the positioning unit 402 can be an absolute positioning sensor/system such as a GPS, a DGPS, a DGPS integrated with motion sensors, a DGPS/INS integration system, or a Real Time Kinematic (RTK) DGPS. Preferably, the positioning unit 402 is installed close to the container being handled, e.g., on the main spreader 210 (such as location D in FIG. 4). Alternatively, the positioning unit could be installed on the trolley 208 which moves along the main girder 202a or on a fixed location on the main girder 202a (such as location D* in FIG. 4) or other parts of the container crane. Since the absolute positioning system provides the position of its installation location, the relative position between the container being handled and the positioning unit needs to be incorporated to determine the position of the container. This relative position can be obtained from the vertical position of the main spreader 210 and the lateral position of the trolley 208 provided by the encoders in the machine room 212.

Alternatively, relative positioning systems can be employed as the positioning unit 402 to provide the position of the container. The relative positioning systems can be vision systems, radar sensors/systems, laser sensors/systems, radio frequency triangulation positioning systems, and so on. In fact, if relative positioning systems are used to determine the position of the container ship, the same relative positioning system can also serve as the positioning unit 402 to determine the position of the container. For example, a camera can be installed on the main girder 202a and its images can capture both the ship (including the pre-selected locations in the ship) and the container being handled. Thus, the positions of both the pre-selected locations and the container can be determined by processing the images. Radar or laser sensors can work in a similar fashion. When radio frequency triangulation positioning systems are used, one or more radio frequency transmitters (or receivers) are installed preferably close to the container, e.g., on the main spreader 210, and they can work with the same radio frequency receivers (or transmitters) that work with those transmitters (or receivers) at the pre-selected locations in the container ship 102. The advantage of sharing the same relative positioning system is that the relative positions are with respect to the same reference coordinate system, which simplifies the position determination process.

During the loading and unloading process, the container being handled is moved with the main spreader 210 to or from its stowage location. Therefore, in order to determine the stowage location of the container, the position of the container needs to be obtained while the container is in the stowage location. Information from container operation indicators or sensors such as the twistlock sensors/switches can be incorporated to determine when the container is in the stowage location. Twistlocks are mechanisms installed at the four corners of the main spreader 210 to secure containers in transit on the crane. When the crane picks up or sets down a container, these twistlock sensors/switches change their outputs or status indication. For example, before the crane picks up a container, all four twistlocks at the four corners of the main spreader 210 must be engaged to secure the container onto the main spreader 210 for lifting; as the twistlocks are engaged, their corresponding twistlock engagement switches will change their status from "disengaged" (or "unlocked") to "engaged" (or "locked") to indicate the engagement of the twistlock. Similarly, after the crane drops off a container into the stowage location in the ship, the twistlocks must be disengaged to release the container off the main spreader 210 before moving the main spreader 210 away for the next job. Thus, the container being handled will be in the stowage location at the time the twistlock changes its status.

Alternatively, the container operation indicator could also be a switch controlled by the crane operator. The crane operator turns on the switch when the container being handled is in its stowage location in the ship and turns off the switch when the container is not in the stowage location.

In one embodiment, the position of the container is obtained only when the container operation indicators indicate that the container is in the stowage location. For example, the change in the twistlock status triggers the recording of the positions from the positioning unit 402 at that specific time only. In some other embodiments, real-time positions from the positioning units 402 are always recorded and the indicator information is used to identify the position corresponding to the time the twistlocks change status. Information from such indicators can also be used to trigger the recording of the position information of the container ship from the positioning unit 302 as mentioned earlier.

In the third step of the method for locating the container's stowage location, a relative position of the container in the container ship is first computed based on the position information of the container ship and the position information of the container; subsequently, the relative position is compared or correlated with a stowage plan of the container ship to determined the container's stowage location. The relative position of the container in the container ship is determined by following three sub-steps.

Sub-Step A

In sub-step A, determination is made of the position of a ship-fixed coordinate system with respect to a reference coordinate system based on the position information of the container ship.

As illustrated in FIGS. 3A and 3B, the positioning of the ship can be uniquely determined once a ship-fixed coordinate system (x-y-z with O as the origin) is determined. The ship-fixed coordinate system is fixed onto the ship; it moves as the ship shift its position and rotates as the ship changes its orientations. The reference coordinate system can be an earth coordinate system that is fixed on the quay (i.e., the earth), which will not change. An earth coordinate system is preferred when the positioning units employs absolute positioning systems. In embodiments where the positioning units employ relative positioning systems, the reference coordinate system can be fixed on a known reference point on the container crane, e.g., the location of the camera, or the radar or laser sensor, or the radio frequency receivers (or transmitters); the reference coordinate system may move as the container crane moves.

The ship-fixed coordinate system x-y-z changes with respect to the reference coordinate system (e.g., Xe-Ye-Ze) due to factors such as tide and load conditions. That is, the position of the origin O, (Oxe, Oye, Oze), changes and the orientation of the x, y, and z axis change, as shown by the angles θ and β (assuming the roll motion of the container ship is negligible). Hence, the ship-fixed coordinate system (x-y-z) is determined if the position of the origin O and the orientation of the x, y, z axis with respect to a reference coordinate system (such as Xe-Ye-Ze with Oe as the origin) are determined.

Since the pre-selected locations A and B are a known, fixed location in the ship, their positions in the ship-fixed coordinate system, (Ax, Ay, Az) and (Bx, By, Bz), will not change. The positions of A and B, (Axe, Aye, Aze) and (Bxe, Bye, Bze) in the reference coordinate system, provided by the positioning units can be represented as:

$$\begin{bmatrix} Axe \\ Aye \\ Aze \end{bmatrix} = \begin{bmatrix} Oxe \\ Oye \\ Oze \end{bmatrix} + T \times \begin{bmatrix} Ax \\ Ay \\ Az \end{bmatrix} \text{ and } \begin{bmatrix} Bxe \\ Bye \\ Bze \end{bmatrix} = \begin{bmatrix} Oxe \\ Oye \\ Oze \end{bmatrix} + T \times \begin{bmatrix} Bx \\ By \\ Bz \end{bmatrix}$$

where T is the rotational transformation matrix between the two coordinate systems:

$$T = \begin{bmatrix} \cos\beta & 0 & -\sin\beta \\ 0 & 1 & 0 \\ \sin\beta & 0 & \cos\beta \end{bmatrix} \times \begin{bmatrix} \cos\theta & -\sin\theta & 0 \\ \sin\theta & \cos\theta & 0 \\ 0 & 0 & 1 \end{bmatrix}$$

Thus, the position of O (Oxe, Oye, Oze) and the angles θ and β can be estimated based on the positions of A and B ((Axe, Aye, Aze) and (Bxe, Bye, Bze)) provided by the positioning units.

When three locations (such as A, B*, and C in FIG. 3) are pre-selected, the assumption of negligible roll motion can be removed and positions of these three locations uniquely determines the ship-fixed coordinate system. The determination or computation of the ship-fixed coordinate system is also based on the rotational and translational transformation between the ship-fixed coordinate system and the reference coordinate system, with an additional rotational transformation added for the roll angle γ. The rotational transformation matrix T becomes:

$$T = \begin{bmatrix} 1 & 0 & 0 \\ 0 & \cos\gamma & -\sin\gamma \\ 0 & \sin\gamma & \cos\gamma \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} \cos\theta & -\sin\theta & 0 \\ \sin\theta & \cos\theta & 0 \\ 0 & 0 & 1 \end{bmatrix}.$$

In embodiments where the orientation of the ship (i.e., the angles θ, β, as well as an optional roll angle γ) is directly obtained based on orientation measuring sensors such as compasses, angular velocity sensors, and IMU, the orientation of the ship-fixed coordinate system and the rotational transformation matrix T are readily available based on the sensor measurements. In such embodiments, the position of only one pre-selected location (such as O in FIGS. 3A and 3B) is needed to establish the position of the origin of the ship-fixed coordinate system.

Sub-Step B

In sub-step B, based on the position of the ship-fixed coordinate system, a transformation relationship from the reference coordinate system to the ship-fixed coordinate system is established. That is, given the estimated (Oxe, Oye, Oze) and orientation angles (θ and β, and possibly γ), the transformation relationship from a position in the reference coordinate system, (Xxe, Xye, Xze), to a position in the ship-fixed coordinate system, (Xx, Xy, Xz) is as follows:

$$\begin{bmatrix} Xx \\ Xy \\ Xz \end{bmatrix} = T^{-1} \times \left( \begin{bmatrix} Xxe \\ Xye \\ Xze \end{bmatrix} \cdot \begin{bmatrix} Oxe \\ Oye \\ Oze \end{bmatrix} \right)$$

where $T^{-1}$ is the inverse of the aforementioned rotational transformation matrix:

$$T^{-1} = \begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\gamma & \sin\gamma \\ 0 & -\sin\gamma & \cos\gamma \end{bmatrix}$$

Sub-Step C

In sub-step C, the relative position of the container in the container ship is then derived by converting the position information of the container ((Pxe, Pye, Pze) in the reference coordinate system) to a position (Px, Py, Pz) in the ship-fixed coordinate system based on the transformation relationship:

$$\begin{bmatrix} Px \\ Py \\ Pz \end{bmatrix} = T^{-1} \times \left( \begin{bmatrix} Pxe \\ Pye \\ Pze \end{bmatrix} \cdot \begin{bmatrix} Oxe \\ Oye \\ Oze \end{bmatrix} \right),$$

with $T^{-1}$ obtained above in sub-step B.

Subsequently, the relative position of the container in the container ship, (Px, Py, Pz), is correlated or compared with the stowage plan to determine its stowage location, represented as ((Bay a1, Row a2, and Tier a3) in the bay-row-tier system. More specifically, the bay number a1, the row number a2, and the tire number a3 are determined by Px, Py, and Pz, respectively. For example, in the ship-fixed coordinate (x-y-z with the origin O) shown in FIGS. 3A and 3B, Px has a linear relationship with the bay number a1: Px=(ao−a1)×L+L/2, where ao is the bay number of the first bay to the right of the origin O and L is the length of container stowage locations. Therefore, the bay number a1 can be derived as: a1=(Px−L/2)/L+ao. The row number and the tier number can be derived in a similar fashion based on Py and Pz. Thus, the stowage location of a container handled by the container crane is determined.

Figure 5:
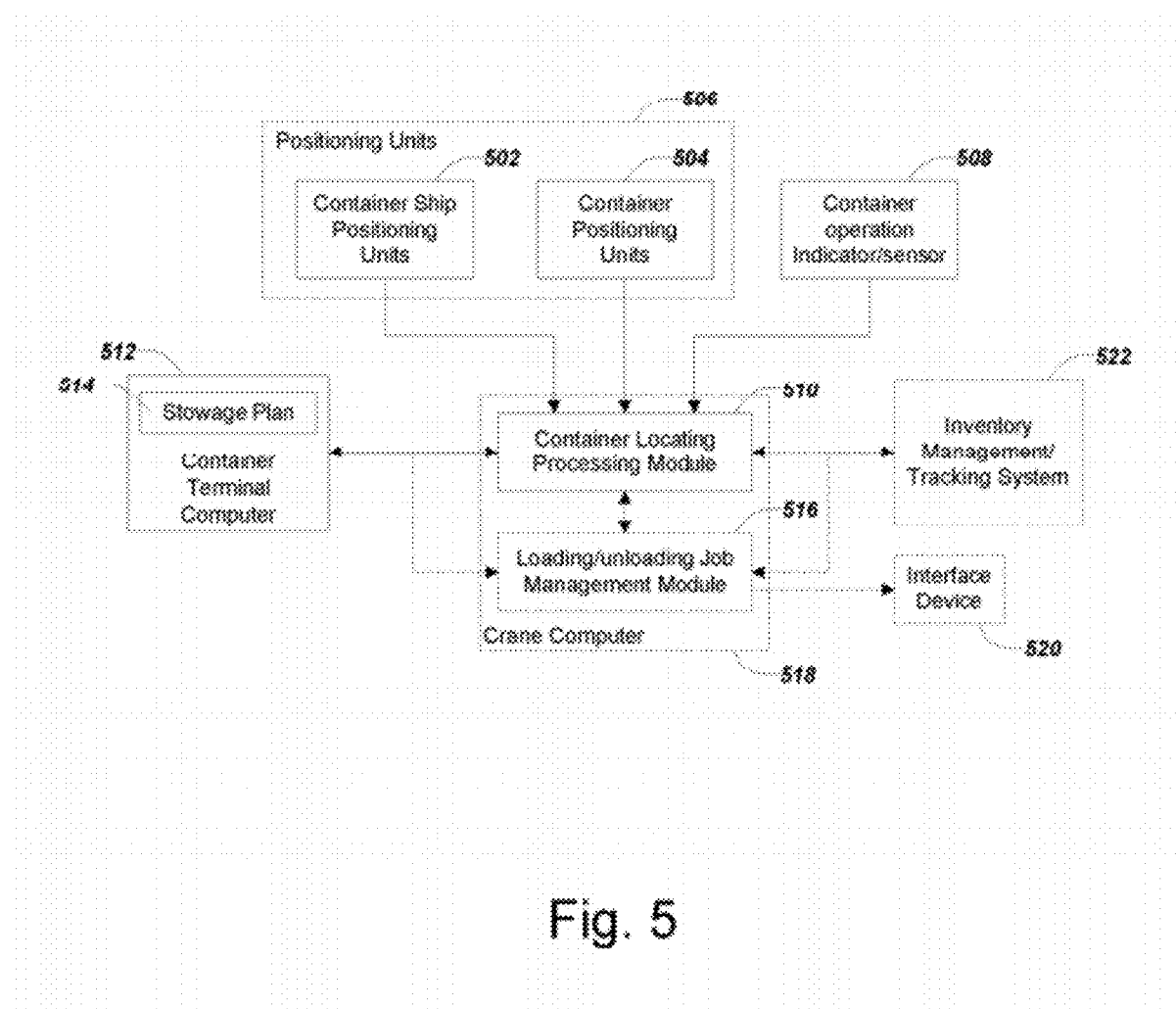
FIG. 5 shows a block diagram of a system for automatically locating containers in a container ship for loading and unloading of the container ship in container terminals.

FIG. 5 shows a block diagram of components of a system for automatically locating containers in a container ship for loading and unloading of the container ship in container terminals. In this system, the container ship positioning units 502 provide positions of the container ship, e.g., by providing positions of at least two pre-selected positions in the container ship or proving orientations of the container ship and position information of at least one pre-selected position. The positioning units 502 can be absolute positioning systems as shown by the positioning units 302 in FIGS. 3A and 3B, as well as relative positioning units such as vision systems, radar or laser sensor systems, and radio frequency triangulation positioning systems, as described earlier. The positioning units 502 may also include orientation measuring sensors such as compasses, angular velocity sensors, and IMUs for providing the orientation of the container ship 102.

The system also includes container positioning units 504, which provide position information of a container that is being handled by a container crane. Similarly, the container positioning units 504 can be an absolute positioning system, such as 402 shown in FIG. 4, or a relative positioning system such as vision systems, radar or laser sensor systems, and radio frequency triangulation positioning systems. When relative poisoning systems are employed, one positioning unit 506 can serve as both the container ship positioning units 502 and the container positioning units 504; for example, one vision system installed on the crane can provide the position of the container ship and the position of the container being handled.

The system in FIG. 5 further includes container operation indicators/sensors 508, such as twistlock switches or switch inputs from the container operator as mentioned earlier, which indicate the time a pick-up operation or a drop-off operation occurs. Information from the container operation indicators/sensors 508 indicates whether the container is in the stowage location or is in transition.

The position information from both positioning units 502 and 504 (or 506 if a single system is used) and the signals from the container operation indicators/sensors 508 are then transmitted to a container locating processing module 510 through wired or wireless communications. If the positioning units 502 or 504 are absolute positioning systems (such as DGPS), wireless communication is preferred for the communication with the container locating processing module 510. The container locating processing module 510 is also connected to a container terminal computer 512, typically through wireless communications. The container terminal computer 112 serves as an input device for providing the stowage plan 514 of the container ship to the container locating processing module 510. Alternatively, other input devices such as memory devices (e.g., USB memory sticks) can be used to load the stowage plan to the container locating processing module 510.

The container locating processing module 510 therefore obtains the position information from the container ship positioning units 502 and the position information from the container positioning units 504. As the positioning units 502 and 504 typically can generate position data in real time, the container locating processing module 510 further uses the information from the container operation indicators/sensors 508 to determine when to record the position data for further processing. As described earlier, the information from the container operation indicator/sensors 508 (such as twistlocks) indicates when the container is in the stowage plan (either right before it is picked up from or right after it is dropped into it stowage location). Thus, the container locating processing module 510 ensures that the container position recorded corresponds to the position of its stowage location.

The container locating processing module 510 determines the container's stowage location based on the position information of the container ship and the container position by following the method described earlier with reference to FIGS. 3A, 3B, and 4. Also as described earlier, other sensors (e.g., a level measuring sensor, compass, and encoders for the lateral and vertical position of the main spreader 210) can be incorporated in the process.

The container locating processing module 510 may reside locally on the crane, in which case, each crane is equipped with a container locating processing module 510. Alternatively, several cranes may share a container locating processing module 510 and the module 510 is located on one of the cranes or on a fixture close by those cranes. In some embodiments, the container locating processing module may reside in the container terminal computer 512 and handle the container locating process for all the cranes in the terminal.

In some embodiments, the container locating processing module 510 reports the identified stowage location of the container being handled back to the container terminal computer 512, which compares the identified stowage location with the job instruction to verify the correctness of the operation. (That is, a container being unloaded from the ship is indeed picked up at the specified stowage location or a container being loaded into the ship is dropped off at the specified stowage location.) If OCR systems are used, the container ID recognized by the OCR is also compared to the job instruction to further verify that the container being handled is the intended container. (This is helpful to ensure that the container picked up at or the container loaded into the specified stowage location is the right container.).

In some other embodiments, the verification of the identified stowage location against the job instructions is carried out locally in a loading/unloading job management module 516. The loading/unloading job management module 516 receives and stores the job instructions from the container terminal computer 512 (or other input devices including memory devices and keyboards); it further receives the identified stowage location from the container locating processing module 510 and compares the stowage location with the job instruction to verify the correctness of the operation. The container locating processing module 510 and the loading/unloading job management module 516 may reside in one crane computer or processor 518, or they can reside in two separate crane computers/processors with wired or wireless communication between them.

The crane computer 518 may also be connected to an interface device 520 (such as a display) to show the crane operator the job instructions, the identified stowage location, and the verification results. The interface device 520 may also provide warnings to the crane operator (such as voice/sound notification or flashing of the stowage location on the display) when the identified stowage location is different from that specified in the job instructions.

In further embodiments, the container locating processing module 510 may also interface with an inventory management/tracking system 522 that tracks containers in the container terminal. The container locating processing module 510 reports the identified stowage location to the inventory management/tracking system 522. If the container is unloaded from the container ship 102, the inventory management/tracking system 522 determines the corresponding container properties such as the container ID and container type based on the stowage plan of the container ship and creates a new entry for this container in its inventory database to start tracking it in the container terminal. If a container is loaded into the container ship, the inventory management/tracking system 522 either removes the entry for this container in its inventory database or marks the entry as departed since the container has left the container terminal. The inventory management/tracking system 522 may also automatically update the stowage plan or generate a new stowage plan accordingly. In some container terminals, the container terminal computer 512 is a part of the inventory management/tracking system 522.

The method for locating a container in a stowage location in the container ship, as described earlier with reference to FIGS. 3A, 3B, 4 and 5, can be used in a reverse fashion to identify the position of a container based on the position of the container ship and the specified stowage location in the job instruction. That is, the reverse problem is to compute the container position (Pxe, Pye, Pze) in the reference coordinate system based on the container ship's position, (Oxe, Oye, Oze) and the two angles θ and β, and the specified stowage location of a container, (Bay a1, Row a2, and Tier a3).

The computation includes the following three steps. First, the position of the stowage location in the ship-fixed coordinate system is determined based on the stowage location ((Bay a1, Row a2, and Tier a3); this position can be a position (Px, Py, Pz) corresponding to the center of the stowage location or a range ([Px−L/2, Px+L/2], [Py−W/2, Py+W/2], [Pz−H/2, Pz+H/2]), where L, W, and H is the length, width, and height of the stowage location (typically corresponding to the length, width, and height of containers). The computation in this step is based on simple linear relationships; for example, Px=(ao−a1)×L+L/2, where ao is the bay number of the first bay to the right of the origin O.

Second, the position of the container ship is determined based on the position information from the positioning units for the container ship (such as 302 in FIGS. 3A, 3B, and 502 in FIG. 5)). That is, the ship-fixed coordinate system (the origin (Oxe, Oye, Oze) and the angles θ, β, and possibly a roll angle γ) is identified. Third, the position of the stowage location in the ship-fixed coordinate system, (Px, Py, Pz), is then converted to a corresponding position in the reference coordinate system, (Pxe, Pye, Pze). The conversion is based on the rotational and translational transformation between the two coordinate systems; the transformation is defined with the position (Oxe, Oye, Oze) and the angles θ, β, and possibly a roll angle γ as described earlier. The identified stowage location can then be used in crane automation systems for automatic operation of the main spreader 210 for loading and unloading a container ship.

Figure 6:
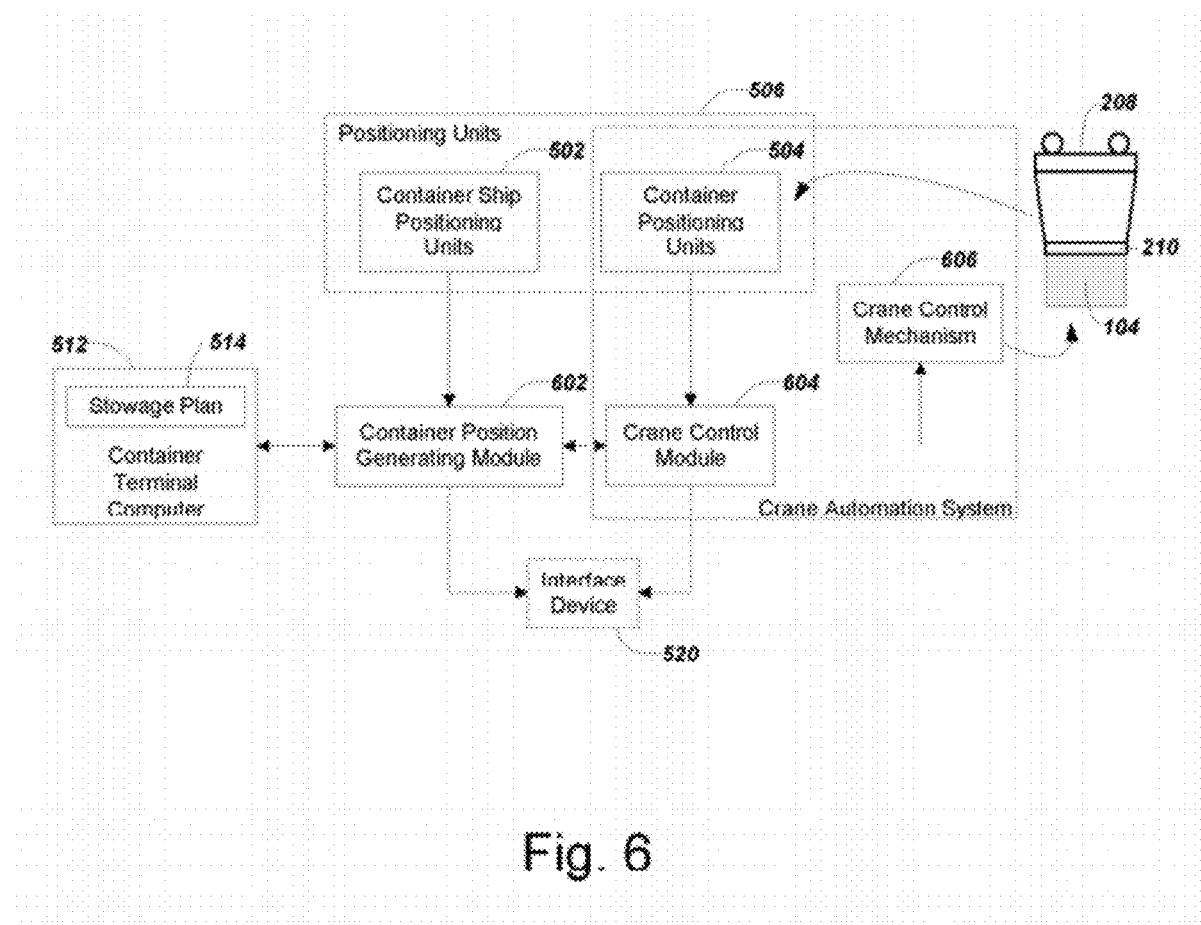
FIG. 6 shows a block diagram of a crane automation system that automatically moves the main spreader of a crane to a stowage location for loading and unloading a container ship.

FIG. 6 is a block diagram of a crane automation system that automatically moves the main spreader 210 to a stowage location specified in the job instructions for loading and unloading a container ship. A container position generating module 602 is included to generate or determine the position of a stowage location in the reference coordinate system. To execute the first step described above, the container position generating module 602 receives from the container terminal compute 512 the stowage plan 514 and the job instructions, and then converts the stowage locations specified in the job instruction to positions in the ship-fixed coordinate system. To execute the second step, the container position generating module 602 obtains the position information of the container ship from the container ship positioning units 502 and estimates the position of the ship as represented by the position of the ship-fixed coordinate system (i.e., (Oxe, Oye, Oze) and the angles θ, β, and possibly γ). In the third step, the container position generating module 602 converts the position of a stowage location from the ship-fixed coordinate system to the reference coordinate system.

The container position generating module 602 then outputs the generated position in the reference coordinate system, (Pxe, Pye, Pze), to a crane control module 604 as the desired position. The crane control module 604 compares the actual position of the main spreader 210 from container positioning unit 504 with the desired position from 602 to determine appropriate control commands to actually move the main spreader 210 to the desired position through crane control mechanism 606 such as motors and mechanical linkages. Thus, the main spreader 210 is moved automatically to the desired stowage location for the loading and unloading.

Although the present invention has been described above with particularity, this was merely to teach one of ordinary skill in the art how to make and use the invention. Many additional modifications will fall within the scope of the invention, as that scope is defined by the following claims.

What is claimed:

1. A method of locating a container in a stowage location of a container ship for loading and unloading of the container ship in a container terminal, comprising the steps of:
   obtaining a first position information of the container ship, wherein the first position information comprises at least one of the following:
      orientation of the container ship and positions of at least one pre-selected location in the container ship, and
      positions of at least two pre-selected locations in the container ship;
   obtaining a second position information of a container when the container is in the stowage location on the container ship; and
   determining the stowage location of the container in the container ship by computing a relative position of the container in the container ship based on the first and the second position information and by correlating the relative position with a stowage plan of the container ship.

2. The method in claim 1, wherein the first position information is provided by positioning units that are installed at the pre-selected locations, and the positioning units comprise at least one of the following: a Global Positioning System (GPS), a Differential GPS (DGPS), a DGPS integrated with motion sensors, a DGPS/INS integration system, and a Real Time Kinematic (RTK) DGPS.

3. The method in claim 1, wherein the orientation of the container ship is provided by an orientation measuring unit, which comprises at least one of the following: compasses, angular velocity sensors, and Inertial Measuring Units.

4. The method in claim 1, wherein the first position information is obtained from at least one of the following: images of the pre-selected locations provided by a vision system, radar measurements of the pre-selected locations provided by a radar sensor, laser measures of the pre-selected locations provided by a laser sensor, radio wave signals of a radio frequency triangulation positioning system wherein at least one of radio wave transmitters and radio wave receivers are installed at the pre-selected locations.

5. The method in claim 1, wherein the first position information further comprises one of the following: a level measurement from a level measuring unit that comprises one of the following: a laser level measuring device and a ultrasonic level measuring device, an orientation measurement from an orientation measuring unit, which comprises at least one of the following: compasses, angular velocity sensors, and Inertial Measuring Units.

6. The method in claim 1, wherein the second position information is provided by a positioning unit installed on a container crane for lifting and lowering the container, and the positioning unit comprises at least one of the following: a Global Positioning System (GPS), a Differential GPS (DGPS), a DGPS integrated with motion sensors, a DGPS/INS integration system, and a Real Time Kinematic (RTK) DGPS.

7. The method in claim 1, wherein the second position information is obtained from at least one of the following: images provided by a vision system, radar measurements provided by a radar sensor, laser measurements provided by a laser sensor, radio wave signals of a radio frequency triangulation positioning system wherein at least one of radio wave transmitters and radio wave receivers are installed on a container crane for lifting and lowering the container.

8. The method in claim 1 further employing container operation indicators for determining when the container is located in the stowage location, wherein the second position information is obtained when signals from the container operation indicators confirm that the container is in the stowage location.

9. The method in claim 1, wherein the computation of the relative position of the container in the container ship further comprises:
   determining a position of a ship-fixed coordinate system with respect to a reference coordinate system based on the first position information;
   determining a transformation relationship between the reference coordinate system and the ship-fixed coordinate system based on the position of the ship-fixed coordinate system; and
   converting the second position information to a position in the ship-fixed coordinate system based on the transformation relationship, whereby the converted position in the ship-fixed coordinate system is the relative position of the container in the container ship.

10. A system for automatically locating a container in a container ship for loading and unloading of the container ship in container terminals, comprising:
    container ship positioning units for providing a first position information of the container ship, wherein the first position information comprises at least one of the following: positions of at least two pre-selected locations in the container ship, and positions of at least one pre-selected location in the container ship and orientations of the ship;
    container operation indicators for indicating whether the container is in a stowage location of the container ship or is in transition;
    container positioning units for providing positions of the container which is being handled by a container crane;
    an input unit for providing a stowage plan of the container ship; and
    a container locating processing module for determining the container's stowage location in the container ship by determining when the container is in the stowage location based on the container operation indicators, obtaining a second position information of the container from the container positioning units when the container is in the stowage location, computing a relative position of the container in the container ship based on the first and the second position information, and correlating the relative position with the stowage plan of the container ship.

11. The system in claim 10, wherein the container locating processing module further outputs the position of the determined stowage location in the container ship to a loading/unloading job management module, and the loading/unloading job management module receives and stores job instructions provided by the input unit and compares the determined stowage location with the job instructions to verify correctness of handling of the container.

12. The system in claim 11 further comprising an interface device connected to at least one of the container locating processing module and the loading/unloading job management module for displaying to the crane operator at least one of the following: the determined stowage location, the job instructions, and verification results from the loading/unloading job management module.

13. The system in claim 10, wherein the container locating processing module further reports the determined stowage location to an inventory management/tracking system, and the inventory management automatically updates an inventory database.

14. The system in claim 10, wherein the input unit for providing the stowage plan of the container ship comprises one of the following:
- a process module for transmitting the stowage plan to the container locating processing module,
- a memory device connected to the container locating processing module for downloading the stowage plan to the container locating processing module,
- a keyboard for accepting the stowage plan input by operators.

15. A system for determining a position of a stowage location of a container ship with respect to a reference coordinate system for automatic loading and unloading of the container ship, comprising:

container ship positioning units for providing a first position information of the container ship in the reference coordinate system, wherein the first position information comprises at least one of the following:
- orientation of the container ship and positions of at least one pre-selected location in the container ship, and
- positions of at least two pre-selected locations in the container ship;

an input unit for providing the stowage location in the container ship; and a container position generating module for determining the position of the stowage location in the reference coordinate system by:
- computing a relative position of the stowage location in a ship-fixed coordinate system;
- determining a position of the ship-fixed coordinate system with respect to the reference coordinate system based on the first position information;
- determining a transformation relationship between the reference coordinate system and the ship-fixed coordinate system based on the position of the ship-fixed coordinate system; and
- converting the relative position of the stowage location in the ship-fixed coordinate system to the position of the stowage location in the reference coordinate system based on the transformation relationship.

16. The system in claim 15, wherein the container position generating module further outputs the generated position of the stowage location to a crane automation system and the crane automation system moves a container handling part of a crane to the generated position of the stowage location for loading and unloading, and wherein the crane automation system comprises:
- container positioning units for providing positions of the container handling part,
- a crane control module for determining control commands based on the position of the stowage location and the positions of the container handling part, and
- crane control mechanisms for receiving the control commands and moving the container handling part to the position of the stowage location.

* * * * *